(12) United States Patent
Pitz

(10) Patent No.: US 9,798,142 B2
(45) Date of Patent: Oct. 24, 2017

(54) DISPLAY ELEMENT HAVING ADJUSTABLE INCLINATION FOR HEAD-UP DISPLAY

(71) Applicant: Johnson Controls Automotive Electronics GmbH, Remchingen (DE)

(72) Inventor: Gerhard Pitz, Hildesheim (DE)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 14/905,646

(22) PCT Filed: Jul. 1, 2014

(86) PCT No.: PCT/EP2014/063988
§ 371 (c)(1),
(2) Date: Jan. 15, 2016

(87) PCT Pub. No.: WO2015/007521
PCT Pub. Date: Jan. 22, 2015

(65) Prior Publication Data
US 2016/0161741 A1    Jun. 9, 2016

(30) Foreign Application Priority Data

Jul. 16, 2013    (DE) .................. 10 2013 213 923

(51) Int. Cl.
*G02B 27/01*    (2006.01)
*B60R 11/02*    (2006.01)

(52) U.S. Cl.
CPC ...... *G02B 27/0149* (2013.01); *B60R 11/0235* (2013.01); *G02B 2027/0154* (2013.01); *G02B 2027/0163* (2013.01)

(58) Field of Classification Search
CPC ........ G02B 27/0149; G02B 2027/0154; G02B 2027/0163
(Continued)

(56) References Cited

U.S. PATENT DOCUMENTS 3,802,764 A    4/1974 Ellis
5,172,100 A    12/1992 Iino
(Continued)

FOREIGN PATENT DOCUMENTS

CN    102062947 A    5/2011
CN    103201669 A    7/2013
(Continued)

OTHER PUBLICATIONS

International Search Report in PCT/EP2014/063988 dated Sep. 1, 2014, 6 pages.
(Continued)

*Primary Examiner* — Christopher Mahoney
(74) *Attorney, Agent, or Firm* — Foley & Lardner LLP

(57) ABSTRACT

A display element includes a projection screen for a head-up display and a pivot apparatus for adjusting an inclination of the projection screen about a horizontal inclination axis. The pivot apparatus includes an eccentric unit for adjusting the inclination. The eccentric unit is mechanically coupled directly to the projection screen. The eccentric unit includes a first gearwheel and an eccentric element which is formed eccentrically with respect to the first gearwheel and is fastened on the first gearwheel. The eccentric element is in the form of a disk and an area of a narrow side of the disk-shaped eccentric element is arranged eccentrically with respect to the first gearwheel.

8 Claims, 2 Drawing Sheets

Figure 1:
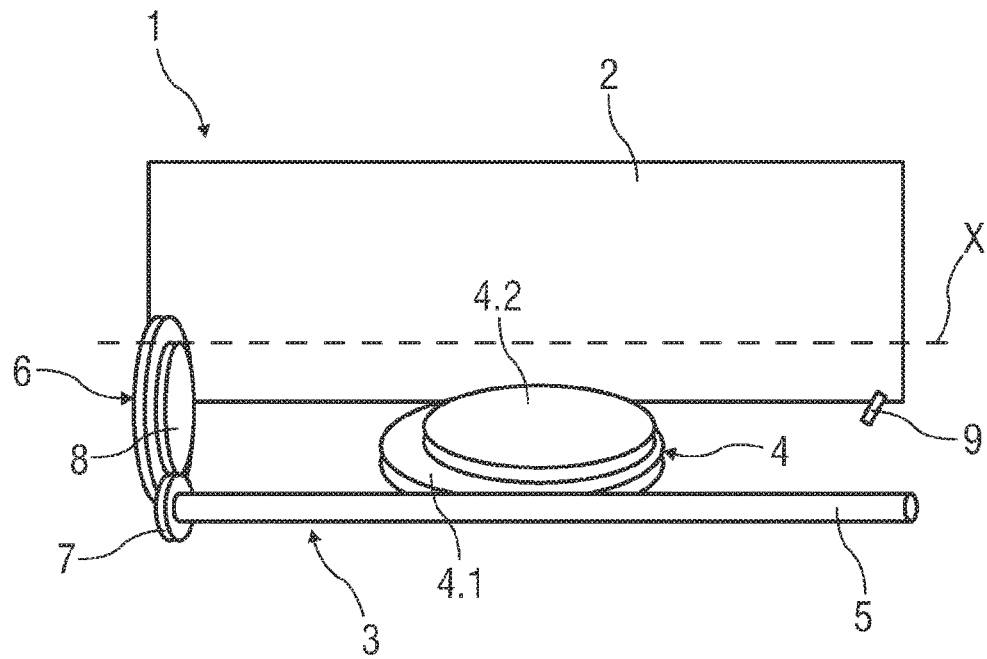

(58) Field of Classification Search
USPC .................................................. 359/443, 632
See application file for complete search history.

(56) References Cited

U.S. PATENT DOCUMENTS

| | | | |
|---|---|---|---|
| 5,200,859 A | | 4/1993 | Payner et al. |
| 5,296,868 A | | 3/1994 | Itami et al. |
| 5,457,575 A | * | 10/1995 | Groves .................. B60K 35/00 |
| | | | 353/13 |
| 5,541,593 A | | 7/1996 | Arsem |
| 6,580,562 B2 | | 6/2003 | Aoki et al. |
| 6,809,872 B2 | | 10/2004 | Eberhardt et al. |
| 8,619,369 B2 | * | 12/2013 | Box ...................... B60K 35/00 |
| | | | 359/632 |
| 8,937,765 B2 | * | 1/2015 | Hopf .................. B60R 11/0235 |
| | | | 359/443 |
| 8,953,247 B2 | * | 2/2015 | Rumpf .................. G02B 7/005 |
| | | | 345/7 |
| 2005/0162340 A1 | | 7/2005 | Nagano et al. |
| 2013/0235454 A1 | | 9/2013 | Hopf et al. |

FOREIGN PATENT DOCUMENTS

| | | |
|---|---|---|
| DE | 41 16 043 C2 | 11/1991 |
| DE | 41 25 070 A1 | 2/1992 |
| DE | 101 35 986 A1 | 2/2002 |
| DE | 101 44 491 A1 | 4/2003 |
| DE | 603 13 449 T2 | 1/2008 |
| JP | H06-505570 A | 6/1994 |
| JP | H09-304739 A | 11/1997 |
| JP | 2003-335148 A | 11/2003 |
| JP | 2005-153723 A | 6/2005 |
| WO | WO-92/15904 A1 | 9/1992 |
| WO | WO-2012/035128 A1 | 3/2012 |

OTHER PUBLICATIONS

Office Action dated Mar. 19, 2014, received in corresponding German application No. 10 2013 213 923.3, 5 pages.
Written Opinion of the International Searching Authority dated Sep. 1, 2014, 5 pages.
Office Action dated Nov. 29, 2016, received in corresponding Japanese application No. 2016-526508 (4 pages) and English translation (3 pages).
Office Action dated Apr. 24, 2017, in corresponding Chinese application No. 201480049551.5, (6 pages) and English translation (5 pages).

* cited by examiner

DISPLAY ELEMENT HAVING ADJUSTABLE INCLINATION FOR HEAD-UP DISPLAY

CROSS REFERENCE TO RELATED APPLICATIONS

The present application is a U.S. National Stage of International Application No. PCT/EP2014/063988 filed on Jul. 1, 2014, which claims the benefit of German Patent Application No. 102013213923.3 filed on Jul. 16, 2013, the entire disclosures of all of which are incorporated herein by reference.

DESCRIPTION

The invention relates to a display unit having a projection screen for a head-up display, with a pivot apparatus for adjusting an inclination of the projection screen about a horizontally running axis of inclination, wherein the pivot apparatus comprises an eccentric unit for adjusting the inclination.

Head-up displays of this type are generally known from the prior art and comprise a display unit having a projection screen, onto which vehicle information is projected by means of an imaging unit and optionally by means of an optical module. The projection screen is in this case designed to be transparent and is arranged in the vehicle driver's field of vision.

In order to provide the vehicle driver with an optimized display which is distinguished, in particular, by a geometrically undistorted and complete depiction of the information, it is necessary, in particular depending on a height and resulting sitting position of the vehicle driver, to adjust an inclination of the projection screen about a horizontally running axis of inclination. A very precise adjustment is required in this case. At the same time, it is necessary to fix the projection screen securely in the adjusted position in order to avoid a change in position during the operation of the head-up display.

JP 2005 153 723 A discloses a display unit having a projection screen for a head-up display. The projection screen is coupled to a drive unit, by means of which said projection screen is movable about an axis of rotation from a closed position into an open position.

In the open position, an inclination of the projection screen is adjustable about a horizontally running axis of inclination by means of a pivot apparatus. For this purpose, the pivot apparatus comprises an eccentric unit and an actuating element which is coupled to the latter and, in the open position of the projection screen, is mechanically operatively connected to the latter, wherein, in order to adjust the inclination of the projection screen, a translator movement of the actuating element takes place by means of a rotatory movement of the eccentric unit. The actuating element is coupled here to a spring element, the spring force of which acts in an opposed manner to the force exerted on the actuating element by means of the eccentric unit and maintains the mechanical operative connection between the eccentric and the actuating element.

Furthermore, DE 41 25 070 A1 discloses a display apparatus for a vehicle, comprising a light-emitting display device for emitting visible light therefrom, and a reflecting part for reflecting visible light from the light-emitting display device in the direction of a driver of the vehicle directly or indirectly via a windshield of the vehicle. The reflecting part is held movably here between a first position, in which the reflecting part completely reflects visible light from the light-emitting display device, and a second position, in which the reflecting part reflects visible light from the light-emitting display element at a comparatively low reflection rate. Furthermore, a device is provided for moving the reflecting part between the first position and the second position, wherein the device comprises a movably mounted cam part, wherein a lower end surface of a housing of the display element is held in elastic contact with a cam lug of the cam part under the constraining force of a spiral spring.

DE 41 16 043 C2, U.S. Pat. No. 3,802,764 A and WO 2012/035128 A1 disclose further display apparatuses for vehicles.

The object on which the present invention is based is to specify a display unit which is improved in comparison to the prior art and has a projection screen for a head-up display.

The object is achieved according to the invention by a display unit which has the features indicated in claim 1.

Advantageous refinements of the invention are the subject matter of the dependent claims.

The display unit having a projection screen for a head-up display comprises a pivot apparatus for adjusting an inclination of the projection screen about a horizontally running axis of inclination, wherein the pivot apparatus comprises an eccentric unit for adjusting the inclination. According to the invention, the eccentric unit is mechanically coupled directly to the projection screen.

This particularly advantageously results in the possibility of obtaining a very small overall size of the display unit, and therefore an arrangement of the display unit can in particular take place even in vehicles having windshields arranged very flat and consequently with a small distance between a dashboard and the windshield. Furthermore, the direct mechanical coupling of the eccentric unit to the projection screen leads to the advantage that an adjustment of the angle of inclination is realizable without hard end stops, thus resulting in the possibility of using simple and therefore cost-effective DC motors. Furthermore, this direct coupling permits in a particularly simple manner an infinitely variable and precise adjustment of the inclination of the projection screen with error-tolerant reproducibility. Furthermore, the pivot apparatus of the display unit according to the invention is distinguished by a high degree of robustness against vibrations and temperature changes, and therefore undesirable changes in the inclination of the projection screen can be prevented.

In this connection, the eccentric unit comprises a first gear wheel and an eccentric element which is formed eccentrically with respect to the first gear wheel and is fastened to the first gear wheel. The gear wheel permits in a simple manner a coupling of the eccentric unit to an actuating unit and the formation of a gearing in order further to increase the precision in the adjustment of the inclination. By means of a variation of an eccentric shape and/or arrangement of the eccentric element, a transmission ratio for adjusting the angle of inclination is adaptable in a particularly simple manner to a respective use.

In addition, the eccentric element is of disk-shaped design. A disk is understood here as meaning an object, the extent of which in a spatial direction is much smaller than the extent thereof in the other two spatial directions of the three-dimensional space. An area of the narrow side of the disk-shaped eccentric element is arranged here eccentrically with respect to the first gear wheel, and therefore a particularly construction-space-saving design of the pivot apparatus and consequently of the display unit is obtainable.

According to a refinement, the first gear wheel is mechanically coupled to a drive shaft, wherein the drive shaft is of helical design at least in sections and, together with the gear wheel, forms a first worm gearing. The first worm gearing firstly makes it possible to have a further improved resolved, infinitely variable and precise adjustment of the inclination of the projection screen, along with improved reproducibility and, in a simple manner, the possibility of a further adjustment of the transmission ratio of the pivot apparatus. Secondly, the result of using the first worm gearing is that the projection screen is fixed securely in the adjusted position due to the meshing of the gear wheel with the drive shaft and a coupling of the drive shaft to a drive unit because of the mechanical resistance of the drive unit.

Furthermore, owing to the use of the first worm gearing, it is possible, for the adjustment, to use a drive unit of low power. It is thus possible further to reduce the construction space requirement for the display unit and the necessary electrical energy for adjusting the inclination of the projection screen.

In a development the drive shaft is mechanically coupled to an actuating unit. The actuating unit is designed here as a motorized drive or manual drive.

In particular, a gearing is arranged between the actuating unit and the drive shaft, which permits a further adjustment of the transmission ratio of the pivot apparatus and therefore a further refinement during the adjustment of the angle of inclination.

For the mechanical coupling of the gearing to the actuating unit, said gearing comprises a second gear wheel which is fastened to the drive shaft.

According to a possible refinement, the second gear wheel is mechanically coupled to a second drive shaft, wherein the second drive shaft is of helical design at least in sections and, together with the second gear wheel, forms a second worm gearing. The second worm gearing also firstly makes it possible to have a further improved resolved, infinitely variable and precise adjustment of the inclination of the projection screen, along with improved reproducibility and, in a simple manner, the possibility of a further adjustment of the transmission ratio of the pivot apparatus. Furthermore, owing to the use of the second worm gearing, it is possible, for the adjustment, to use a drive unit of further reduced power.

Alternatively, the second drive shaft is mechanically coupled to a manual actuating element of the actuating unit, which results in a reduction in the costs and in a particularly high degree of robustness of the pivot apparatus.

In order always to keep the projection screen in contact with the eccentric unit, at least one spring element is provided, according to a possible refinement, the spring force of which acts in the opposite direction to the force exerted on the projection screen by means of the eccentric unit and maintains the mechanical operative connection between the eccentric and the actuating element in every projection screen inclination which is adjustable by means of the eccentric unit.

Figure 2:
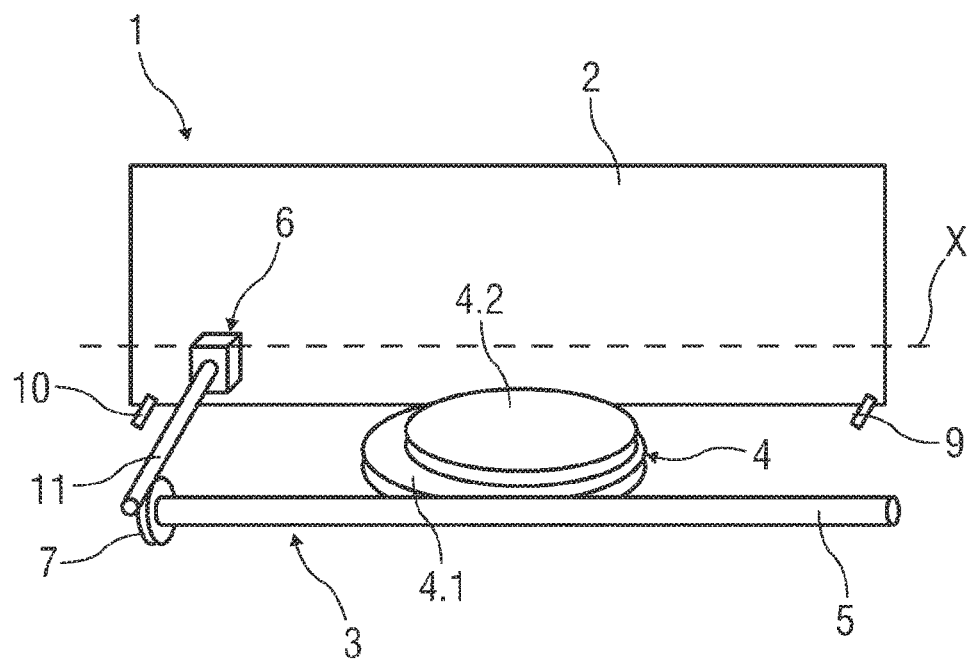
Figure 3:
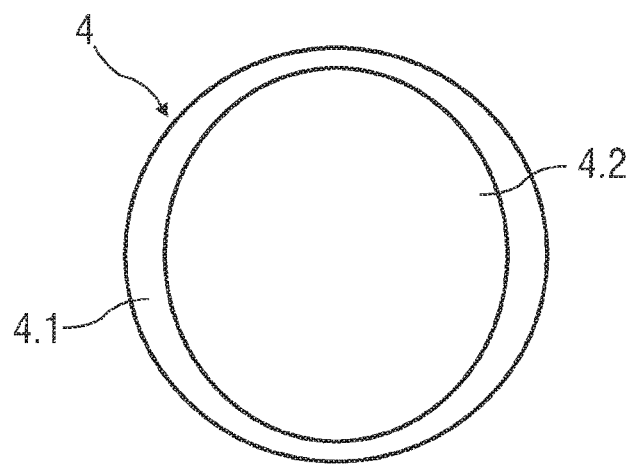
Figure 4:
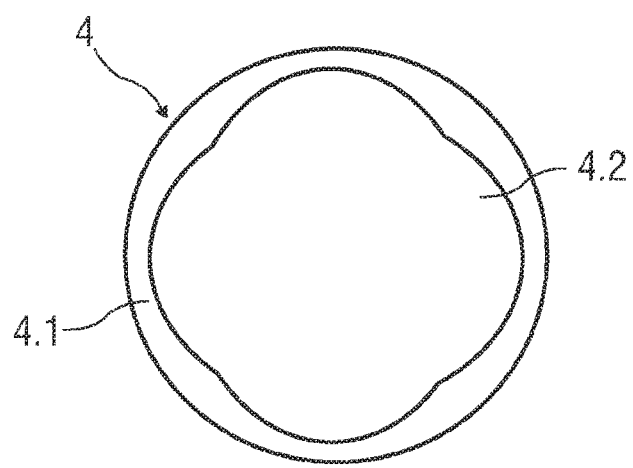

Exemplary embodiments of the invention are explained in more detail below with reference to drawings, in which:

FIG. 1 shows diagrammatically a perspective view of a detail of a first exemplary embodiment of the display unit according to the invention with manual drive, FIG. 2 shows diagrammatically a perspective view of a detail of a second exemplary embodiment of the display unit according to the invention with a motorized drive, FIG. 3 shows diagrammatically a top view of a second exemplary embodiment of an eccentric unit of a possible exemplary embodiment of the display unit according to the invention, and FIG. 4 shows diagrammatically a top view of a third exemplary embodiment of an eccentric unit of a possible exemplary embodiment of the display unit according to the invention.

Parts corresponding to one another are provided with the same reference signs in all of the figures.

FIG. 1 illustrates a possible first exemplary embodiment of a detail of the display unit 1 according to the invention in a perspective view.

The display unit 1 is provided here for realizing a "head-up display" in a vehicle (not shown), wherein information is displayed to a driver of the vehicle in the region of a windshield of the vehicle by means of the head-up display.

For said display, the display unit 1 comprises a projection screen 2 which is in particular of transparent design and is arranged, for example, in or on a dashboard of the vehicle. The projection screen 2 is designed here, for example, in such a manner that said projection screen is continuously located above the dashboard within a viewing range of the driver. Alternatively, the project screen 2 is completely movable, i.e. in particular is retractable into a cavity within the dashboard below the surface thereof and is extendable out of said cavity when use is desired.

In order to be able to variably adjust an inclination of the projection screen 2 about a horizontally running axis of inclination X, a pivot apparatus 3 is provided for pivoting the projection screen 2 about the axis of inclination X.

The pivot apparatus 3 comprises an eccentric unit 4, which is mechanically coupled directly to the projection screen 2, for the adjustment of the inclination, wherein, in the exemplary embodiment illustrated, the eccentric unit 4 comprises a first gear wheel 4.1 and an eccentric element 4.2 which is arranged eccentrically, for example by 1 mm, with respect to the first gear wheel 4.1 and is fastened to the first gear wheel 4.1. The gear wheel 4.1 and the eccentric element 4.2 here have a circular area and are of disk-shaped design. A disk in the present case is understood as meaning an object, the extent of which is much smaller in one spatial direction than the extents thereof in the other two spatial directions of the three-dimensional space. An area of the narrow side of the disk-shaped eccentric element 4.2, which area is mechanically operatively connected to the projection screen 2, is arranged eccentrically with respect to the first gear wheel 4.1.

In order to actuate the first gear wheel 4.1, the latter is mechanically coupled to a first drive shaft 5, wherein the drive shaft 5 is of helical design at least in sections and, together with the gear wheel 4.1, forms a first worm gearing.

In order to actuate the drive shaft 5, the latter is mechanically coupled to an actuating unit 6. In the exemplary embodiment illustrated, the actuating unit 6 is designed as a manual drive, in particular as a hand wheel, and is coupled to the eccentric unit 4 by means of a gearing which is arranged between the actuating unit 6 and the first drive shaft 5 and is formed from a second gear wheel 7, which is fastened to the drive shaft 5, and from a third gear wheel 8, which is fastened to the actuating unit 6.

The adjustment of the inclination of the projection screen 2 takes place here by means of a manual rotational movement of the actuating unit 6, wherein said rotational movement is transmitted via the gearing and the first worm gearing to the eccentric unit 4 and is converted into a rotational movement, which substantially takes place about a vertical axis, of said eccentric unit. Owing to the eccentric arrangement of the eccentric unit 4.2 with respect to the first gear wheel 4.1, the adjustment of the inclination of the projection screen 2 takes place without an end stop.

In order, during the adjustment of the inclination, to keep the projection screen 2 and the eccentric element 4.2 in contact in all of the positions of the projection screen 2 and of the eccentric unit 4, two spring elements 9, 10, which are designed, for example, as helical springs, are provided, the spring force of which acts in the opposite direction to the force exerted on the projection screen 2 by means of the eccentric unit 4 and therefore always maintains the mechanical operative connection between the eccentric unit 4 and the projection screen 2. In the exemplary embodiment illustrated, the spring element 10 is concealed here by the actuating unit 6. The spring element 10 is illustrated in more detail in FIG. 2.

An adjustment of a transmission ratio between the rotational movement at the actuating unit 6 and the strength of the inclination adjustment connected thereto is predeterminable by means of an adjustment of individual transmission ratios of the gearing, the worm gearing and the eccentric unit 4. A precision in the adjustment of the inclination is therefore predeterminable in a simple manner.

FIG. 2 shows a possible second exemplary embodiment of the display unit 1 according to the invention in a perspective view.

In contrast to the exemplary embodiment illustrated in FIG. 1, the actuating unit 6 is designed as a motorized drive, in particular as a simple DC motor.

For the mechanical coupling of the actuating unit 6 to the first drive shaft 5, the actuating unit 6 is coupled to a second drive shaft 11 which is drivable by the actuating unit 6.

The second drive shaft 11 is mechanically coupled in turn by means of the second gear wheel 7 to the first drive shaft 5, wherein the second drive shaft 11 is of helical design at least in sections and, together with the second gear wheel 7, forms a second worm gearing.

The adjustment of the inclination of the projection screen 2 takes place here by means of a motorized rotational movement of the actuating unit 6, wherein said rotational movement is transmitted via the first and second worm gearing to the eccentric unit 4 and is converted into the rotational movement, which substantially takes place about the vertical axis, of said eccentric unit. Also in this case, because of the eccentric arrangement of the eccentric unit 4.2 with respect to the first gear wheel 4.1, the adjustment of the inclination of the projection screen 2 takes place without an end stop, and therefore the use of simple and cost-effective DC motors as the actuating unit 6 is possible.

An adjustment of a transmission ratio between the rotational movement at the actuating unit 6 and the strength of the inclination adjustment connected thereto is predeterminable by means of an adjustment of the individual transmission ratios of the worm gearings and of the eccentric unit 4.

FIG. 3 illustrates a second exemplary embodiment of the eccentric unit 4 in a top view. In contrast to the first exemplary embodiment of the eccentric unit 4 that is illustrated in FIGS. 1 and 2, the eccentric element 4.2 does not have a circular area, but rather an oval area, and therefore a distance of the area of the narrow side of the disk-shaped eccentric element 4.2 is arranged at different distances to the area of the narrow side of the first gear wheel 4.1 and therefore eccentrically with respect thereto. This eccentric unit 4 also permits an adjustment of the inclination of the projection screen 2 without an end stop.

FIG. 4 shows, in a top view, a third exemplary embodiment of the eccentric unit 4.

In contrast to the first exemplary embodiment of the eccentric unit 4 that is illustrated in FIGS. 1 and 2, the eccentric element 4.2 does not have a circular area, but rather an area with a plurality of protrusions, and therefore a distance of the area of the narrow side of the disk-shaped eccentric element 4.2 is arranged at different distances to the area of the narrow side of the first gear wheel 4.1 and therefore eccentrically with respect thereto.

LIST OF REFERENCE SIGNS

1 display unit
2 projection screen
3 pivot apparatus
4 eccentric unit
4.1 first gear wheel
4.2 eccentric element
5 first drive shaft
6 actuating unit
7 second gear wheel
8 third gear wheel
9 spring element
10 spring element
11 second drive shaft
X axis of inclination

The invention claimed is:
1. A display unit comprising:
a transparent projection screen for a head-up display;
a pivot apparatus for adjusting an inclination of the projection screen about a horizontally running axis of inclination,
wherein the pivot apparatus comprises an eccentric unit for infinitely variably adjusting the inclination without an end stop,
wherein the eccentric unit is rotatable about a vertical axis,
wherein the eccentric unit is mechanically coupled directly to the projection screen,
wherein the eccentric unit comprises a first gear wheel and an eccentric element which is formed eccentrically with respect to the first gear wheel and is fastened to the first gear wheel,
wherein the eccentric element is of disk-shaped design and an area of a narrow side of the disk-shaped eccentric element is arranged eccentrically with respect to the first gear wheel.
2. The display unit as claimed in claim 1, wherein the first gear wheel is mechanically coupled to a first drive shaft, wherein the first drive shaft is of helical design at least in sections and, together with the gear wheel, forms a first worm gearing.
3. The display unit as claimed in claim 2, wherein the first drive shaft is mechanically coupled to an actuating unit.
4. The display unit as claimed in claim 3, wherein a gearing is arranged between the actuating unit and the first drive shaft.
5. The display unit as claimed in claim 4, wherein the gearing comprises a second gear wheel which is fastened to the first drive shaft.
6. The display unit as claimed in claim 5, wherein the second gear wheel is mechanically coupled to a second drive shaft, wherein the second drive shaft—is of helical design at least in sections and, together with the second gear wheel, forms a second worm gearing.

7. The display unit as claimed in claim 6, wherein the second drive shaft is mechanically coupled to an electric drive of the actuating unit.

8. The display unit as claimed in claim 6, wherein the second drive shaft is mechanically coupled to a manual actuating element of the actuating unit.

\* \* \* \* \*